Nov. 10, 1925.
N. W. STORER ET AL
MOTOR GENERATOR SET
Filed June 14, 1923      2 Sheets-Sheet 1
1,561,370
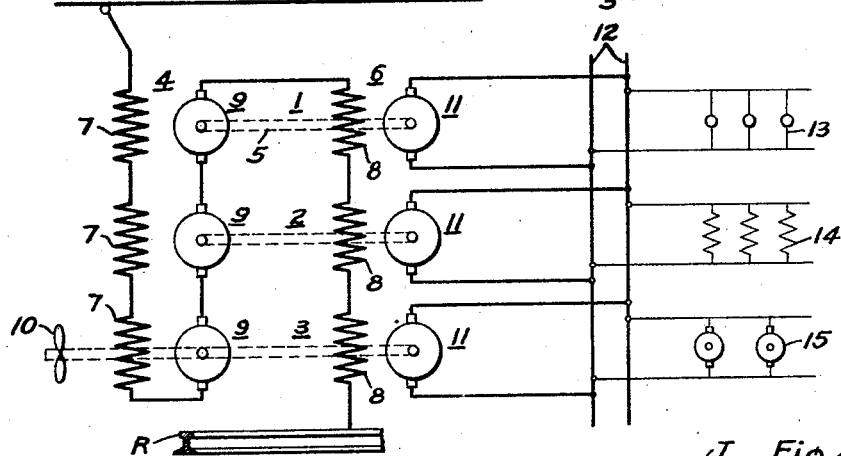
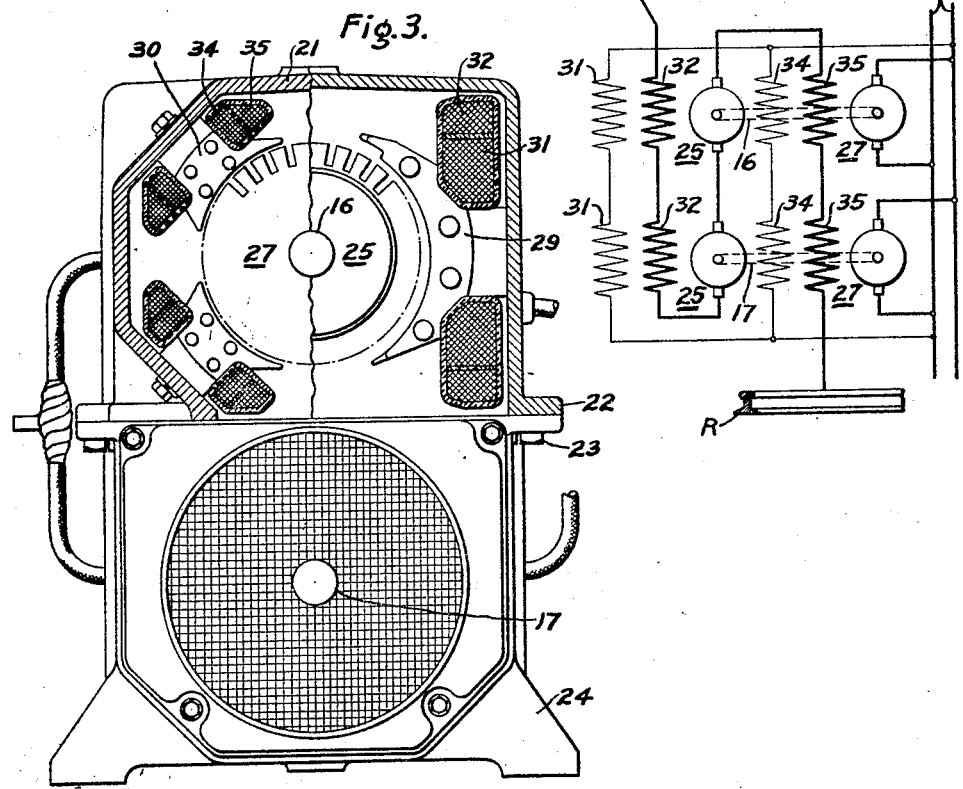
WITNESSES:
INVENTORS
Norman W. Storer &
Ralph E. Ferris
BY
ATTORNEY

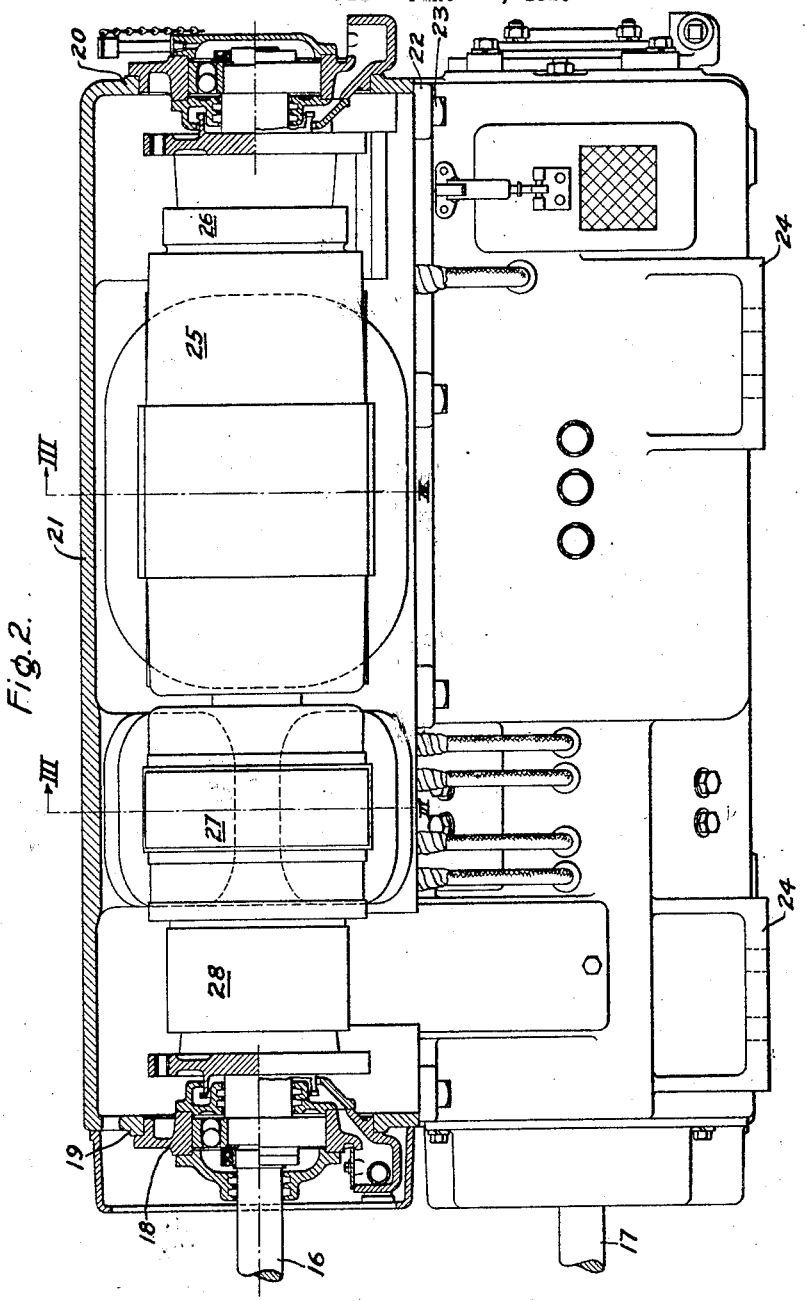

Patented Nov. 10, 1925.

1,561,370

UNITED STATES PATENT OFFICE.

NORMAN W. STORER, OF PITTSBURGH, AND RALPH E. FERRIS, OF SWISSVALE, PENNSYLVANIA, ASSIGNORS TO WESTINGHOUSE ELECTRIC AND MANUFACTURING COMPANY, A CORPORATION OF PENNSYLVANIA.

MOTOR-GENERATOR SET.

Application filed June 14, 1923. Serial No. 645,240.

*To all whom it may concern:*

Be it known that we, NORMAN W. STORER, a citizen of the United States, and a resident of Pittsburgh, in the county of Allegheny and State of Pennsylvania, and RALPH E. FERRIS, a citizen of the United States, and a resident of Swissvale, in the county of Allegheny and State of Pennsylvania, have invented a new and useful Improvement in Motor-Generator Sets, of which the following is a specification.

Our invention relates to motor generator sets, and it has special reference to motor generator sets for high-voltage direct-current railway car and locomotive auxiliary equipments.

In the design of locomotive and car equipments for operation on high-voltage direct-current circuits, the most serious difficulty is experienced in connection with the auxiliary equipment. It is impractical to operate the auxiliary apparatus, such as control equipment, lighting equipment, air-compressors and blowers, directly from the high-voltage circuit, both on account of the expense and the relative unreliability of the necessary high-voltage switching equipment and on account of the small size of the auxiliary motors. Furthermore, where regenerative braking is employed, it is frequently necessary to have a supply of low-voltage current for exciting the fields of the traction motors. A reliable source of low-voltage power for the above and other auxiliary apparatus is, therefore, of first importance.

Various systems have been suggested utilizing storage batteries, but it is generally preferred to omit the storage batteries on account of the maintenance difficulties.

Several kinds of motor generators have been used, but they have not proved entirely satisfactory from the operating and commercial standpoint. They consisted, generally, of a motor having a double winding and two commutators connected in series across the high voltage supply, each commutator taking one-half of the line voltage, and a low-voltage generator driven by the motor. Doubly wound armatures of that type are difficult to construct, and owing to the different commutating constants of the two windings are sensitive in operation and therefore, unreliable. Other constructions, employing a plurality of motors driving one or more generators, have been used, but considerable trouble has been experienced by reason of unequal load distribution and lack of co-operation between the several motors.

In an endeavor to solve the foregoing very serious problem which has been met with in railway electrification, we have invented a motor-generator set comprising a novel combination of motors and generators, and capable of serving as a reliable source of low-voltage electrical power, and of acting, at the same time, as a direct mechanical drive for any desired mechanical load.

In its broader aspects, our invention consists in a combination of a plurality of motor-generator units, each of the motors operating on a substantially equal fraction of the high-voltage supply and carrying a substantially equal part of the total load.

Our invention consists in circuit arrangements and structural details of motor-generator sets of the above-indicated character, whereby most efficient and reliable operation is obtained under the special conditions encountered in railway service.

Other features of novelty which characterize our invention will be pointed out with particularity in the appended claims.

In the accompanying drawings, Figure 1 is a diagrammatic view of a motor-generator set embodying our invention; Fig. 2 is a view, partially in section and partially in side elevation, of a slightly different motor-generator set embodying a preferred form of our invention; Fig. 3 is a view, partially in elevation and partially in sections on the lines III—III and III—III of Fig. 2 and Fig. 4 is a diagram of connections of the motor-generator set illustrated in Figs. 2 and 3.

In Figure 1 is shown a plurality of motor-generators 1, 2 and 3, each comprising a direct-current motor 4 mechanically connected, as by means of a shaft 5, to a direct-current generator 6. The motors and generators are provided with field windings 7 and 8, respectively, and the several field windings are connected in series relation with the motor armatures 9, across a high-voltage direct-current source illustrated by means of a trolley wire T and a return conductor R. One of the motors is shown as driving a mechanical load, such as a fan 10.

The armatures of the generators are adapted for low-voltage operation and are connected in parallel to a bus-bar 12, from which a lighting system 13, control coil 14, auxiliary driving motors 15 and other auxiliary apparatus, not shown in the drawing, may be supplied. The series operation of the motors and the parallel operation of the generators secure operation of the motors upon a fraction of the supply voltage, and at the same time causes the load to be equally carried by the several motors. A slight decrease in the load of one machine is followed by an immediate increase in its speed causing the machine to pick up the load again and maintain a load equilibrium between the motors.

The voltage across the low-voltage bus-bar is kept substantially constant independently of the speed of the motors, an increase of the speed being accompanied by a decrease in the motor current and a corresponding decrease in the strength of the generator fields excited by the said current.

A mechanical load driven by one or more of the motors will not disturb, in any way, the load equilibrium between the several motors, by reason of the fact that the tendency of the loaded shaft to slow down will be followed instantly by a lower voltage on its generator and a flow of current from the other generator causing the first generator to run as a motor.

Equal load distribution between the several motors is an essential feature of our invention, because it secures equal speed for the several armatures and consequently equal voltage across the motors operating on the high-voltage circuit as well as across the generators operating on the low-voltage circuit.

In Figs. 2 and 3 is shown a motor-generator set embodying a preferred form of our invention. It consists essentially in a twin-armature, bi-polar motor such as that described and claimed in Patent No. 1,255,486, granted February 5, 1918, to Norman W. Storer. A pair of shafts 16 and 17, disposed in parallel relation one above the other, are rotatably supported by a plurality of ball-bearing cases 18, having their seats in openings in end portions 19 and 20 of a hollow, substantially rectangular enclosing frame or casing 21. The casing may consist of two halves secured together by means of flanges 22 and bolts 23, the lower half of the casing being also provided with supporting brackets or feet 24.

Each of the shafts carriers a motor armature 25, provided with a winding and a commutator 26, as described in the hereinbefore mentioned Storer patent, and also an additional generator armature 27, provided with a winding and a commutator 28. The armatures may embody any suitable structural details that are commonly used. The frame 21 is provided with proper portions carrying four detachable polar projections 29 facing the motor armatures and eight similar polar projections 30 facing the generator armatures. The end portions of the shafts 16 and 17 may be adapted to drive mechanical loads by means of couplings (not shown).

Two field windings 31, 32 and 34, 35 are provided on each of the pole pieces 29 and 30, respectively, said field windings being connected according to the diagram shown in Fig. 4 and explained hereinafter. The polar projections 29 corresponding to the motors are so arranged as to force the magnetic flux of the two armatures 25 through a single common path in the frame 21, tending to equalize the fluxes in the motors, as explained in the above mentioned patent. The construction thus secures a motor-generator combination which is highly efficient on high-voltage direct current service and meets, by reason of its adaptability, a distinctly felt want in railway service.

As shown in Fig. 4 the motors and the generators are excited by series windings 32 and 35, respectively, and shunt windings 31 and 34, respectively. The series windings are connected in series relation with the two motor armatures 25, across the high voltage supply conductors T, R, while the shunt windings 31 and 34 are connected, in two parallel circuits, to the low-voltage bus-bars 12.

The object of the shunt winding is to prevent the series motors from running away when no load is carried by them and it has special application where the auxiliaries are not permanently, either mechanically or electrically, associated with the motor-generator set.

We do not desire to limit ourselves to the particular construction and arrangements shown above, but aim in the appended claims to cover all such modifications as are within the scope of our invention.

We claim as our invention:

1. The combination of plurality of motor-generators, each motor-generator comprising a motor and a dynamo-electric machine mechanically coupled thereto, the armatures and field windings of said motors and the field windings of said dynamo-electric machines being connected in series relation across a source of supply, and the armatures of said dynamo electric machines being connected in parallel circuit relation to secure equal load distribution between the individual motors.

2. In a motor generator set, the combination of a plurality of motor-generators, each motor-generator comprising a motor of the commutator type and a generator of the commutator type mechanically coupled thereto, series field windings and shunt field windings upon said motors and generators, means for connecting the armatures of said motors and the series windings of said motors and generators in series relation across a direct-current source, means for connecting the armatures of said generators in parallel relation to a low voltage load, means for energizing the shunt field windings of said motors and generators, and means for driving a mechanical load from one or more of said motors.

3. A twin motor generator set comprising two parallel shafts each of said shafts carrying a motor armature and a generator armature, polar members co-operating with said armature, series windings upon said polar members, a magnetizable frame associated with said polar members and inclosing said armatures and polar members, means to connect said motor armatures and said series field windings in series relation to a high voltage direct current supply, and means to connect each said generator armature in parallel relation to a low voltage load, the polar projections and field windings of said motor armatures being arranged to force the magnetic flux of said two motor armatures through a single common path in the body of said magnetizable frame.

4. The combination with a plurality of motors having drooping speed torque characteristics, of a generator mechanically connected to each of said motors, means for energizing said motors from a common source, one or more additional independently variable loads mechanically connected also to one or more of said motors, and means for connecting said generators in parallel whereby the mechanical torque delivered by said motors shall be somewhat equalized notwithstanding unequal mechanical load distribution.

5. The combination with a plurality of motors having drooping speed-torque characteristics, of a generator mechanically connected to each of said motors, means for energizing said motors in series from a common source, one or more additional independently variable loads mechanically connected also to one or more of said motors, means for connecting said generators in parallel whereby the mechanical torque delivered by said motors shall be somewhat equalized notwithstanding unequal mechanical load distribution, and electro-responsive means for reducing the excitation of said generators during conditions of increased speed operation of said motors.

6. A twin motor generator set comprising two parallel shafts, each of said shafts carrying a motor armature and a generator armature, polar members co-operating with said armatures, field windings upon said polar members, and a magnetizable frame associated with said polar members and inclosing said armatures and polar members, the polar projections and field windings of said motor armatures being adapted to force the magnetic flux of said two motor armatures through a single common path in the body of said magnetizable frame.

In testimony whereof, we have hereunto subscribed our names this 12th day of June, 1923.

NORMAN W. STORER.
RALPH E. FERRIS.